United States Patent [19]
Aoyama et al.

[11] Patent Number: 5,623,034
[45] Date of Patent: Apr. 22, 1997

[54] PROCESS FOR PRODUCING STYRENIC POLYMER

[75] Inventors: Yoshiaki Aoyama; Norio Tomotsu, both of Ichihara, Japan

[73] Assignee: Idemitsu Kosan Co., Ltd., Tokyo, Japan

[21] Appl. No.: 685,981

[22] Filed: Jul. 22, 1996

Related U.S. Application Data

[63] Continuation of Ser. No. 364,767, Dec. 27, 1994, abandoned.

[30] Foreign Application Priority Data

Dec. 27, 1993 [JP] Japan ................................ 5-329509

[51] Int. Cl.$^6$ .................................................. C08F 12/08
[52] U.S. Cl. ......................... 526/160; 526/77; 526/133; 526/134; 526/150; 526/153; 526/170; 526/346
[58] Field of Search .......................... 526/77, 150, 153, 526/160, 170, 133, 134, 142, 165, 346

[56] References Cited

U.S. PATENT DOCUMENTS

| | | | |
|---|---|---|---|
| 5,066,741 | 11/1991 | Campbell, Jr. | 526/160 X |
| 5,142,005 | 8/1992 | Albizzati et al. | 526/160 X |
| 5,183,853 | 2/1993 | Guerra et al. | 526/347.2 X |

FOREIGN PATENT DOCUMENTS 0410361  1/1991  European Pat. Off. .

OTHER PUBLICATIONS

Pellecchia et al, Novel Aluminoxane–free catalysts for syndio-specific polymerization of styrene, Macromol. Chem., Rapid Commun., 13, 265–268 (1992).

*Primary Examiner*—Fred Teskin
*Attorney, Agent, or Firm*—Oblon, Spivak, McClelland, Maier & Neustadt, P.C.

[57] ABSTRACT

There is disclosed a process for producing a syndiotactic polystyrene (SPS) which comprises polymerizing a styrenic monomer having a content of indene-based compounds of at most 50 ppm by bringing a polymerization catalyst into contact with the above styrenic monomer, which catalyst preferably comprises an (A) transition metal compound (e.g. Ti compound) and (B) an (a) compound capable of reacting with the above transition metal compound (component (A)) to form an ionic complex (e.g. DMAB) or a (b) oxygen atom-containing compound (e.g. MAO), and optionally a (C) alkyl group-containing metallic compound (e.g. TIBA). By virtue of using the above styrenic monomer, the process enables to minimize the amount of the residual metals in the resultant styrenic polymer without deterioration of the catalytic activity, simplify the process and thereby curtail the production cost of SPS.

10 Claims, No Drawings

PROCESS FOR PRODUCING STYRENIC POLYMER

This application is a continuation of application Ser. No. 08/364,767, filed on Dec. 27, 1994, now abandoned.

BACKGROUND OF THE INVENTION

1. Field of the Invention

The present invention relates to a process for producing a styrenic polymer. More particularly, it pertains to a process for producing a styrenic polymer having a high degree of syndiotactic configuration efficiently and inexpensively.

2. Description of the Related Arts

In recent years, there has been proposed a process for producing a styrenic polymer having a syndiotactic configuration (hereinafter sometimes referred to as "SPS") by polymerizing a styrenic monomer by means of a catalyst comprising a transition metal compound as a primary ingredient, especially a titanium compound and an alkylaluminoxane (refer to Japanese Patent Application Laid-Open No. 187708/1987).

There has also been proposed a process for efficiently producing such a styrenic polymer (SPS) by the use of a catalyst comprising a coordination complex compound composed of an anion in which a plurality of radicals are bonded to a metal and a cation, while dispensing with an aluminoxane which is expensive and is to be used in a large amount (refer to Japanese Patent Application Laid-Open Nos. 249503/1992, 249504/1994, etc.)

However, the use of the above-mentioned catalyst for the purpose of polymerizing a styrenic monomer involves the problems that the catalytic activity deteriorates resulting in an increase in the amounts of residual metals contained in the styrenic polymer thus produced and causing a decrease in the molecular weight of the resultant styrenic polymer or a deterioration of the hue of the same and that the amounts of the residual metals need to be reduced, thus complicating the production process of the polymer, for example, an increase in the number of steps, whereby the production cost of the polymer is unreasonably increased.

As a result of intensive research and investigation made by the present inventors under such circumstances, it has been found that in the case of polymerizing a styrenic monomer by bringing a catalyst for producing SPS into contact therewith, an indene-based compound which is contained in the styrenic monomer exerts significant effect on the catalytic activity of the catalyst. The present invention has been accomplished on the basis of the above-mentioned finding and information.

SUMMARY OF THE INVENTION

Specifically the present invention provides a process for producing a styrenic polymer having a syndiotactic configuration which comprises polymerizing a styrenic monomer having a content of indene-based compounds of at most 50 ppm by bringing a polymerization catalyst for producing the styrenic polymer having a syndiotactic configuration into contact with said styrenic monomer.

A preferred embodiment to carry out the present invention is the process which comprises using a polymerization catalyst comprising a (A) transition metal compound and (B) at least one compound selected from the group consisting of an (a) compound capable of reacting with said transition metal compound as the component (A) to form an ionic complex and an (b) oxygen atom-containing compound represented by the general formula (I) or by the general formula (II)

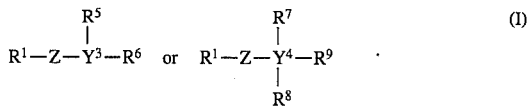

wherein Z is a structure in which one or more groups represented by the formula

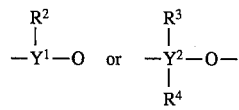

are arranged in an arbitrary order in the number of arbitrary positive integers; $R^1$ to $R^9$ are each an alkyl group having 1 to 8 carbon atoms and may be the same as or different from each other; $y^1$ and $y^3$ are each a Group 13 metal of the Periodic Table and may be the same as or different from each other; and $y^2$ and $y^4$ are each a Group 14 metal of the Periodic Table and may be the same as or different from each other and optionally a (C) alkyl group-containing metallic compound.

By the term "syndiotactic polystyrene (SPS)" as used herein is meant a styrenic polymer having a high degree of syndiotactic configuration in its polymerization chain of a styrenic monomer.

DESCRIPTION OF THE PREFERRED EMBODIMENT

There is no specific limitation to the polymerization catalyst to be used in the process according to the present invention, but mention may be made of a variety of usable catalysts, among which is particularly preferable a catalyst which comprises an (A) transition metal compound; (B) an (a) compound capable of reacting with said transition metal compound as the component (A) to form an ionic complex or a (b) oxygen atom-containing compound having a specific constitution and; as necessary, a (C) alkyl group-containing metallic compound.

As a transition metal compound as the component (A) usable in the process of the present invention, mention may be made of a variety of compounds, usually the compound represented by the general formula (III) or (IV)

wherein M is a metal belonging to any of the groups 3 to 6 of the Periodic Table or a lanthanoid metal; $R^8$, $R^9$, $R^{10}$ and $R^{11}$ are each a hydrogen atom, an alkyl group an alkoxyl group an aryl group an alkylaryl group an arylalkyl group, an acyloxyl group a cyclopentadienyl group a substituted cyclopentadienyl group, an indenyl group a substituted indenyl group, a fluorenyl group, a substituted fluorenyl group, an alkylthio group, an arylthio group, an amino group ($-NR_2$), a chelating ligand or a halogen atom; e, f and g are each an integer of from 0 to 4; h and i are each an integer of from 0 to 3; and any two of $R^8$ to $R^{11}$ may form a complex which is crosslinked with $CH_2$, $Si(CH_3)_2$ or the like.

As a metal belonging to any of the groups 3 to 6 of the Periodic Table or a lanthanoid metal as indicated by M, there are preferably employed the group 4 metals, especially titanium, zirconium, hafnium and the like. Various titanium compounds can be used and a preferred example is at least one compound selected from the group consisting of titanium compounds and titanium chelate compounds represented by the general formula (V) or (VI):

$$TiR^{14}_e R^{15}_f R^{16}_g R^{17}_{4-(e+f+g)} \quad (V)$$

or $$TiR^{14}_h R^{15}_i R^{16}_{3-(h+i)} \quad (VI)$$

wherein $R^{12}$, $R^{13}$, $R^{14}$ and $R^{15}$ are each a hydrogen atom, an alkyl group having 1 to 20 carbon atoms, an alkoxyl group having 1 to 20 carbon atoms, an aryl group having 6 to 20 carbon atoms, an alkylaryl group, an arylalkyl group, an acyloxyl group having 1 to 20 carbon atoms, a cyclopentadienyl group, a substituted cyclopentadienyl group, an indenyl group, a substituted indenyl group, a fluorenyl group, a substituted fluorenyl group, an alkylthio group, an arylthio group an amino group ($-NR_2$), a chelating ligand or a halogen atom; e, f and g are each an integer from 0 to 4; h and i are each an integer from 0 to 3; and any two of $R^{14}$ to $R^{17}$ may form a complex which is crosslinked with $CH_2$, $Si(CH_3)_2$ or the like.

$R^{14}$, $R^{15}$, $R^{16}$ and $R^{17}$ in the general formulae (V) and (VI) each represent a hydrogen atom an alkyl group having 1 to 20 carbon atoms (specifically, methyl group, ethyl group, propyl group, butyl group, amyl group, isoamyl group, isobutyl group, octyl group and 2-ethylhexyl group), an alkoxyl group having 1 to 20 carbon atoms (specifically, methoxyl group, ethoxyl group, propoxyl group, butoxyl group, amyloxyl group, hexyloxyl group, and 2-ethylhexyloxyl group), an aryl group having 6 to 20 carbon atoms an alkylaryl group an arylalkyl group (specifically, phenyl group, tolyl group xylyl group and benzyl group), an acyloxyl group having 1 to 20 carbon atoms (specifically heptadecylcarbonyloxy group), a cyclopentadienyl group, a substituted cyclopentadienyl group (specifically methylcyclopentadienyl group, 1,2-dimethylcyclopentadienyl group pentamethylcyclopentadienyl group and 4, 5, 6, 7-tetrahydro1,2, 3-trimethylindenyl group), an indenyl group, a substituted indenyl group (specifically, methylindenyl group, dimethylindenyl group, tetramethylindenyl group and hexamethylindenyl group), a fluorenyl group, a substituted fluorenyl group (specifically, methylfluorenyl group, dimethylfluorenyl group, tetramethylfluorenyl group and octamethylfluorenyl group), an alkylthio group (specifically methylthio group, ethylthio group, butylthio group, amylthio group isoamylthio group, isobutylthio group, octylthio group and 2-ethylthio group) an arylthio group (specifically phenylthio group, p-methylphenylthio group and p-methoxyphenylthio group), an amino group ($-NR_2$), a chelating ligand (specifically 2,2'-thiobis (4-methyl-6-tert-butylphenyl) group, or a halogen atom (specifically chlorine bromine iodine and fluorine). These $R^{14}$, $R^{15}$, $R^{16}$, $R^{17}$ may be the same as or different from each other.

More desirable titanium compounds include a titanium compound represented by the formula (VII)

$$TiR^{18}XYZ \quad (VII)$$

wherein $R^{18}$ represents a cyclopentadienyl group, a substituted cyclopentadienyl group an indenyl group, a substituted indenyl group, a fluorenyl group, a substituted fluorenyl group or the like; X, Y, and Z, independently of one another are a hydrogen atom an alkyl group having 1 to 12 carbon atoms an alkoxyl group having 1 to 12 carbon atoms an aryl group having 6 to 20 carbon atoms, an aryloxyl group having 6 to 20 carbon atoms an arylalkyl group having 6 to 20 carbon atoms an alkyl-or-arylamide group having 1 to 40 carbon atoms or a halogen atom. Here any one of X, Y and Z and $R^{16}$ may form a compound which is crosslinked with $CH_2$, $SiR_2$ or the like.

The substituted cyclopentadienyl group represented by $R^{16}$ in the above formula is, for example, a cyclopentadienyl group substituted by at least one of an alkyl group having 1 to 6 carbon atoms, more specifically, methylcyclopentadienyl group 1,2-dimethylcyclopentadienyl group, 1,2,4-trimethylcyclopentadienyl group, 1,2,3,4-tetramethylcyclopentadienyl group trimethylsilylcyclopentadienyl group, 1,3-di(trimethylsilyl) cyclopentadienyl group, tert-butylcyclopentadienyl group, 1,3-di(tert-butyl)cyclopentadienyl group, pentamethylcyclopentadienyl group or the like. In addition, X, Y, and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxyl group having 1 to 12 carbon atoms (specifically, methoxyl group, ethoxyl group, propoxyl group, butoxyl group, amyloxyl group, hexyloxyl group, octyloxyl group and 2-ethylhexyloxyl group), an aryl group having 6 to 20 carbon atoms (specifically, phenyl group and naphthyl group), an aryloxyl group having 6 to 20 carbon atoms (specifically, phenoxyl group), an arylalkyl group having 6 to 20 carbon atoms (specifically, benzyl group), an alkyl-or-arylamide group having 1 to 40 carbon atoms (specifically,dimethylamide group, diethylamide group, diphenylamide group and methylphenylamide group) or a halogen atom (specifically, chlorine, bromine, iodine and fluorine).

Specific examples of the titanium compound represented by the general formula (VII) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, 1, 2, 4-trimethylcyclopentadienyltrimethyltitaniam, 1, 2, 3, 4-tetramethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxyltitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, (tert-butylamide)dimethyl-(tetramethyl η$^5$-cyclopentadienyl)silanetitanium dichloride, dimethyl(tert-butylamide)dimethyl(tetramethyl η$^5$-cyclopentadienyl)silanetitanium, (tert-butylamide)dimethyl(tetramethyl η$^5$-cyclopentadienyl)silanetitanium dimethoxide, 4,5,6,7-tetrahydroindenyltitanium trimethoxide, 1-methyl-4,5,6,7-tetrahydroindenyltitanium trimethoxide, 2-methyl-4,5,6,7-tetrahydroindenyltitanium trimethoxide, 1,2-dimethyl-4,5,6,7-tetrahydroindenyltitanium trimethoxide, 1,3-dimethyl-4,5,6,7-tetrahydroindenyltitanium trimethoxide, 1,2,3-trimethyl-4,5,6,7-tetrahydroindenyltitanium trimethoxide, 1,2,3,4,5,6,7-heptamethyl-4,5,6,7-tetrahydroindenyltitanium trimethoxide, 1,2,4,5,6,7-hexamethyl-4,5,6,7-tetrahydroindenyltitanium trimethoxide, 1,3,4,5,6,7-hexamethyl-4,5,6,7-tetrahydroindenyltitanium trimethoxide, octahydrofluorenyltitanium trimethoxide, 1,2,3,4-tetrahydrofluorenyltitanium trimethoxide, 9-methyl-1,2,3,4-tetrahydrofluorenyltitanium trimethoxide and 9-methyl-octahydrofluorenyltitanium trimethoxide.

Of these titanium compounds, a compound not containing a halogen atom is preferred and a titanium compound having one electron type ligand is particularly desirable.

Furthermore, a condensed titanium compound represented by the general formula (VIII) may be used as the titanium compound.

wherein R$^{19}$ and R$^{20}$ each represent a halogen atom, an alkoxyl group having 1 to 20 carbon atoms or an acyloxyl group; and k is an integer from 2 to 20.

Furthermore, the above titanium compounds may be used in the form of a complex formed with an ester, an ether or the like.

The trivalent titanium compound represented by the formula (VI) typically includes a trihalogenated titanium such as titanium trichloride; and a cyclopentadienyltitanium compound such as cyclopentadienyltitanium dichloride, and pentamethylcyclopentadienyltitanium dimethoxide and also those obtained by reducing a tetravalent titanium compound. These trivalent titanium compounds may be used in the form of a complex formed with an ester, an ether or the like.

In addition, examples of the zirconium compound used as the transition metal compound include tetrabenzylzirconium, zirconium tetraethoxide, zirconium tetrabutoxide, bis-indenylzirconium dichloride, triisopropoxyzirconium chloride, zirconium benzyldichloride and tributoxyzirconium chloride. Examples of the hafnium compound include tetrabenzylhafnium, hafnium tetraethoxide and hafnium tetrabutoxide. Examples of the vanadium compound include vanadyl bisacetylacetonato, vanadyl triacetylacetonato, vanadyl triethoxide and vanadyl tripropoxide. Of these transition metal compounds, the titanium compounds are particularly suitable.

Aside from the foregoing, the transition metal compounds constituting the component (A) of the catalyst include the transition metal compound with two ligands having conjugated π electrons, for example, at least one compound selected from the group consisting of the transition metal compounds represented by the general formula:

$$M^1R^{21}R^{22}R^{23}R^{24} \qquad (IX)$$

wherein M$^1$ is titanium, zirconium or hafnium; R$^{21}$ and R$^{22}$ are each a cyclopentadienyl group, substituted cyclopentadienyl group, indenyl group, substituted indenyl group, fluorenyl group or substituted fluorenyl group; and R$^{23}$ and R$^{24}$ are each a hydrogen atom, a halogen atom, a hydrocarbon group having 1 to 20 carbon atoms, an alkoxyl group having 1 to 20 carbon atoms, an amino group or thioalkoxyl group having 1 to 20 carbon atoms, but R$^{20}$ and R$^{22}$ may be each crosslinked by a hydrocarbon group having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of R$^{21}$ and R$^{22}$ in the general formula (IX) designates a cyclopentadienyl group, substituted cyclopentadienyl group, more specifically, methylcyclopentadienyl group; 1,3-dimethylcyclopentadienyl group; 1,2,4-trimethylcyclopentadienyl group; 1,2,3,4-tetramethylcyclopentadienyl group; pentamethylcyclopentadienyl group; trimethylsilylcyclopentadienyl group; 1,3-di(trimethylsilyl)cyclopentadienyl group; 1,2,4-tri(trimethylsilyl)cyclopentadienyl group; tert-butylcyclopentadienyl group; 1,3-di(tert-butyl)cyclopentadienyl group; 1,2,4-tri(tert-butyl)cyclopentadienyl group or the like, indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and crosslinked by an alkylidene group having 1 to 5 carbon atoms, more specifically, methine group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like. Each of R$^{23}$ and R$^{24}$ independently indicates, as described above but more specifically, a hydrogen atom; an alkyl group having 1 to 20 carbon atoms such as methyl group, ethyl group, propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxyl group, hexyloxyl group, octyloxyl group or 2-ethylhexyloxyl group; an aryloxyl group having 6 to 20 carbon atoms such as phenoxyl group; an amino group; or a thioalkoxyl group having 1 to 20 carbon atoms.

Specific examples of the transition metal compounds represented by the general formula (IX) wherein M$^1$ is titanium include bis(cyclopentadienyl)dimethyltitanium; bis(cyclopentadienyl)diethyltitanium; bis(cyclopentadienyl)dipropyltitanium; bis(cyclopentadienyl)dibutyltitanium; bis(methylcyclopentadienyl)dimethyltitanium; bis(tert-butylcyclopentadienyl)dimethyltitanium; bis(1,3-dimethylcyclopentadienyl)dimethyltitanium; bis(1,3-di-tert-butylcyclopentadienyl)dimethyltitanium; bis(1,2,4-trimethylcyclopentadienyl)dimethyltitanium; bis(1,2,3,4-tetramethylcyclopentadienyl)dimethyltitanium; bis(pentamethylcyclopentadienyl)dimethyltitanium; bis(trimethylsilylcyclopentadienyl)dimethyltitanium; bis(1,3-di(trimethylsilyl)cyclopentadienyl)dimethyltitanium; bis(1,2,4-tris(trimethylsilyl)cyclopentadienyl)dimethyltitanium; bis(indenyl)dimethyltitanium; bis(fluorenyl)dimethyltitanium; methylenebis(cyclopentadienyl)dimethyltitanium; ethylidenebis(cyclopentadienyl)dimethyltitanium; methylenebis(2,3,4,5-tetramethylcyclopentadienyl)dimethyltitanium; ethylidenebis(2,3,4,5-tetramethylcyclopentadienyl)dimethyltitanium; dimethylsilylenebis(2,3,4,5-tetramethylcyclopentadienyl)dimethyltitanium; methylenebisindenyldimethyltitanium; ethylidenebisindenyldimethyltitanium; dimethylsilylenebisindenyldimethyltitanium; methylenebisfluorenyldimethyltitanium; ethylidenbisfluorenyldimethyltitanium; dimethylsilylenebisfluorenyldimethyltitanium; methylene-(tert-butylcyclopentadienyl)(cyclopentadienyl)dimethyltitanium; methylene(cyclopentadienyl)(indenyl)dimethyltitanium; ethylidene(cyclopentadienyl)(indenyl)dimethyltitanium; dimethylsilylene(cyclopentadienyl)(indenyl)dimethyltitanium; methylene(cyclopentadienyl)(fluorenyl)dimethyltitanium; ethylidene(cyclopentadienyl)(fluorenyl)dimethyltitanium; dimethylsilylene(cyclopentadienyl)(fluorenyl)dimethyltitanium; methylene(indenyl)(fluorenyl)dimethyltitanium; ethylidene(indenyl)(fluorenyl)dimethyltitanium; dimethylsilylene(indenyl)(fluorenyl)dimethyltitanium; bis-(cyclopentadienyl)dibenzyltitanium; bis(tert-butylcyclopentadienyl)dibenzyltitanium; bis(methylcyclopentadienyl)dibenzyltitanium; bis(1,3-dimethylcyclopentadienyl)dibenzyltitanium; bis(1,2,4-trimethylcyclopentadienyl)dibenzyltitanium; bis(1,2,3,4-tetramethylcyclopentadienyl)dibenzyltitanium; bis(pentamethylcyclopentadienyl)dibenzyltitanium; bis(trimethylsilylcyclopentadienyl)dibenzyltitanium; bis 1,3-di-(trimethylsilyl)cyclopentadienyl dibenzyltitanium; bis 1,2,4-tris(trimethylsilyl)cyclopentadienyl dibenzyltitanium; bis(indenyl)dibenzyltitanium; bis(fluorenyl)dibenzyltitanium; methylenebis(cyclopentadienyl)dibenzyltitanium; ethylidenebis(cyclopentadienyl)dibenzyltitanium; methylenebis(2,3,4,5-tetramethylcyclopentadienyl)dibenzyltitanium; ethylidenebis(2,3,4,5-tetramethylcyclopentadienyl)dibenzyltitanium; dimethylsilylenebis(2,3,4,5-tetramethylcyclopentadienyl)dibenzyltitanium; methylenebis(indenyl)dibenzyltitanium; ethylidenebis(indenyl)dibenzyltitanium; dimethylsilylenebis(indenyl)dibenzyltitanium; methylenebis(fluorenyl)dibenzyltitanium; ethylidenebis(fluorenyl)dibenzyltitanium; dimethylsilylenebis(fluorenyl)dibenzyltitanium; methylene(cyclopentadienyl)(indenyl)dibenzyltitanium; ethylidene(cyclopentadienyl)(indenyl)dibenzyltitanium; dimethylsilylene(cyclopentadienyl)(indenyl)dibenzyltitanium; methylene(cyclopentadienyl)(fluorenyl)dibenzyltitanium; ethylidene(cyclopentadienyl)(fluorenyl)dibenzyltitanium; dimethylsilylene(cyclopentadienyl)(fluorenyl)dibenzyltitanium; methylene(indenyl)(fluorenyl)dibenzyltitanium; ethylidene(indenyl)(fluorenyl)dibenzyltitanium; dimethylsilylene(indenyl)(fluorenyl)dibenzyltitanium; biscyclopentadienyltitanium dimethoxide; biscyclopentadienyltitanium diethoxide; biscyclopentadienyltitanium dipropoxide; biscyclopentadienyltitanium dibutoxide; biscyclopentadienyltitanium diphenoxide; bis(methylcyclopentadienyl)titanium dimethoxide; bis(1,3-dimethylcyclopentadienyl)titanium dimethoxide; bis(1,2,4-trimethylcyclopentadienyl)titanium dimethoxide; bis(1,2,3,4-tetramethylcyclopentadienyl)titanium dimethoxide; bispentamethylcyclopentadienyltitanium dimethoxide; bis(trimethylsilylcyclopentadienyl)titanium dimethoxide; bis-1,3-di(trimethylsilyl)cyclopentadienyltitanium dimethoxide; bis[(1,2,4-tris(trimethylsilyl)cyclopentadienyl)]titanium dimethoxide; bisindenyltitanium dimethoxide; bisfluorenyltitanium dimethoxide; methylenebiscyclopentadienyltitanium dimethoxide; ethylidenebiscyclopentadienyltitanium dimethoxide; methylenebis(2,3,4,5-tetramethylcyclopentadienyl)titanium dimethoxide; ethylidenebis(2,3,4,5-tetramethylcyclopentadienyl)titanium dimethoxide; dimethylsilylenebis(2,3,4,5-tetramethylcyclopentadienyl)titanium dimethoxide; methylenebisindenyltitanium dimethoxide; methylenebis(methylindenyl)titanium dimethoxide; ethylidenebisindenyltitanium dimethoxide; dimethylsilylenebisindenyltitanium dimethoxide; methylenebisfluorenyltitanium dimethoxide; methylenebis(methylfluorenyl)titanium dimethoxide; ethylidenebisfluorenyltitanium dimethoxide; dimethylsilylenebisfluorenyltitanium dimethoxide; methylene(cyclopentadienyl)(indenyl)titanium dimethoxide; ethylidene(cyclopentadienyl)(indenyl)titanium dimethoxide; dimethylsilylene(cyclopentadienyl)(indenyl)titanium dimethoxide; methylene(cyclopentadienyl)(fluorenyl)titanium dimethoxide; ethylidene(cyclopentadienyl)(fluorenyl)titanium dimethoxide; dimethylsilylene(cyclopentadienyl)(fluorenyl)titanium dimethoxide; methylene(indenyl)(fluorenyl)titanium dimethoxide; ethylidene(indenyl)(fluorenyl)titanium dimethoxide; and dimethylsilylene(indenyl)(fluorenyl)titanium dimethoxide.

Examples of the transition metal compounds represented by the formula (IX) wherein $M^1$ is zirconium include ethylidenebiscyclopentadienylzirconium dimethoxide and dimethylsilylenebiscyclopentadienylzirconium dimethoxide. Examples of the hafnium compounds according to the general formula (IX) include ethylidenebiscyclopentadienylhafnium dimethoxide, dimethylsilylenebiscyclopentadienylhafnium dimethoxide, etc. Particularly desirable transition metal compounds among them are titanium compounds. In addition to the combinations of the above, the compound may be a bidentate coordination complex compound such as 2,2'-thiobis(4-methyl-6-tert-butylphenyl)titanium diisopropoxide; 2,2'-thiobis(4-methyl-6-tert-butylphenyl)titanium dimethoxide or the like.

Of these transition metal compounds according to the present invention, a titanium compound having at least one ligand with conjugated electrons is preferable. Any of these transition metal compounds may be used alone or in combination with at least one other one.

There are available various compounds capable of reacting with the above-mentioned transition metal compound to form an ionic complex to be used as the component (B) (a) in the polymerization catalyst according to the present invention and there is preferably usable the coordination complex compound composed of a cation and an anion in which a plurality of radicals are bonded to a metal as represented by the following general formula (X) or (XI):

$$([L^1-H]^{p+})_q([M^2X^1X^2\cdots X^r]^{(r-s)-})j \qquad (X)$$

or $$([L^2]^{p+})_q([M^3X^1X^2\cdots X^r]^{(r-s)-})j \qquad (XI)$$

wherein $L^2$ is $M^4$, $R^{25}R^{26}M^5$ or $R^{27}_3C$ as hereinafter described; $L_1$ is a Lewis base; $M^2$ and $M^3$ are each a metal selected from Groups 5 to 15 of the Periodic Table; $M^4$ is a metal selected from Group 1 and Groups 8 to 12 of the Periodic Table; $M^5$ is a metal selected from Groups 8 to 10 of the Periodic Table; $X^1$ to $X^r$ are each a hydrogen atom a dialkylamino group, an alkoxyl group an aryloxyl group, an alkyl group having 1 to 20 carbon atoms an aryl group an alkylaryl group or an arylalkyl group each having 6 to 20 carbon atoms a substituted alkyl group an organometalloid group or a halogen atom; $R^{25}$ and $R^{26}$ are each a cyclopentadienyl group, a substituted cyclopentadienyl group, an indenyl group or a fluorenyl group; $R^{27}$ is an alkyl group; s is the valency of each of $M^2$ and $M^3$, indicating an integer of 1 to 7; r is an integer of 2 to 8; p is the ion valency of each of [$L^1$—H] and [$L^2$], indicating an integer of 1 to 7; q is an integer of 1 or more; and j=qxp/(r–s).

Specific examples of $M^2$ and $M^3$ include B, Al, Si, P, As, Sb, etc. in the form of atom; those of $M^4$ include Ag, Cu, Na, Li, etc. in the form of atom; and those of $M^5$ include Fe, Co, Ni, etc. in the form of atom. Specific examples of $X^1$ to $X^r$ include a dialkylamino group such as dimethylamino and diethylamino; an alkoxyl group such as methoxyl, ethoxyl and n-butoxyl; an aryloxyl group such as phenoxyl, 2,6-dimethylphenoxyl and naphthyloxyl; an alkyl group having 1 to 20 carbon atoms such as methyl, ethyl, n-propyl, iso-propyl, n-butyl, n-octyl and 2-ethylhexyl; an aryl group, an alkylaryl group or an arylalkyl group each having 6 to 20 carbon atoms, such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; a halogen atom such as F, Cl, Br and I; and an organometalloid such as pentamethylantimony group, trimethylsilyl group, trimethylgermyl group, diphenylarsine group, dicyclohexylantimony group and diphenylboron group. Specific examples of substituted cyclopentadienyl group represented by any of $R^{25}$ and $R^{26}$ include methylcyclopentadienyl, butylcyclopentadienyl and pentamethylcyclopentadienyl.

Specific examples of the anion in which a plurality of radicals are bonded to a metal include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6CF_3F_4)_4^-$, $B(C_6F_5)_4^-$, $BF_4^-$, $PF_6^-$, $P(C_6F_5)_6^-$ and $Al(C_6HF_4)_4^-$.

Specific examples of the metallic cation include $CpFe^+$, $(MeCp)_2Fe^+$, $(tBuCp)_2Fe^+$, $(Me^2Cp)_2Fe^+$, $(Me_3Cp)_2Fe^+$, $(Me_4Cp)_2Fe^+$, $(Me_5Cp)_2Fe^+$, $Ag^+$, $Na^+$, and $Li^+$ wherein Me is a methyl group and Cp is a cyclopentadienyl group. Specific examples of other cations include a nitrogen atom-containing compound such as pyridinium, 2,4-dinitro-N,N-diethylanilinium, diphenylammonium, p-nitroanilinium, 2,5-dichloroaniline, p-nitro-N,N-dimethylanilinum, quinolinium, N,N-dimethylanilinum and N,N-diethylanilinium; a carbenium compound such as triphenylcarbenium, tri(4-methylphenyl)carbenium and tri(4-methoxyphenyl)carbenium; an alkylphosphonium ion such as $CH_3PH_3^+$, $C_2H_5PH_3^+$, $C_3H_7PH_3^+$, $(CH_3)_2PH_2^+$, $(C_2H_5)_2PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$ and $(C_3H_7)_4P^+$; and an arylphosphonium ion such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$ and $(C_2H_5)_2(C_6H_5)_2P^+$.

Among the compounds represented by the general formula (X) or (XI), specific examples of preferably usable compounds include, as the compound of the general formula (X), triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl)borate, pyrrolinium tetrakis(pentafluorophenyl)borate, N,N-dimethylanilinium tetrakis(pentafluorophenyl)borate and methyldiphenylammonium tetrakis(pentafluorophenyl)borate, and as the compound of the general formula (XI), ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, silver hexafluoroarsenate, silver hexafluoroantimonate and silver tetrafluoroborate.

In addition, as the compound capable of reacting with the transition metal compound as the component (a) to form an ionic complex, there are usable, for example, $B(C_6F_5)_3$, $B(C_6HF_4)_3$, $B(C_6H_2F_3)_3$, $B(C_6H_3F_2)_3$, $B(C_6H_4F)_3$, $B(C_6CF_3F_4)_3$, $BF_3$, $PF_5$, $P(C_6F_5)_5$ and $Al(C_6HF_4)_3$.

In the present invention, the above-mentioned compound capable of reacting with the transition metal compound as the component (a) to form an ionic complex may be used alone or in combination with at least other one.

Aside from the foregoing, as the oxygen atom-containing compound as the component (b), there are used such compound having a chain structure represented by the general formula (I)

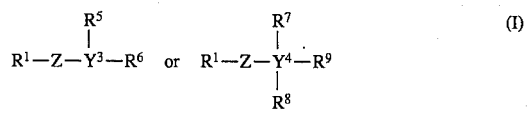

and/or such compound having a cyclic structure represented by the general formula (II)

In the above-mentioned general formulae (I) and (II), Z is a structure in which one or more groups represented by the formula

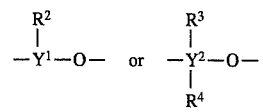

are arranged in an arbitrary order in the number of arbitrary positive integers; $R^1$ to $R^9$ are each an alkyl group having 1 to 8 carbon atoms and specifically exemplified by methyl group, ethyl group, n-propyl group, isopropyl group, various butyl groups, various pentyl groups, various hexyl groups, various heptyl groups and various octyl groups; $R^1$ to $R^9$ may be the same as or different from each other; $y^1$ and $y^3$ are each a Group 13 metal of the Periodic Table and specifically exemplified by B, Al, Ga, In and Tl, among which B and Al are preferable; $Y^1$ and $Y^3$ may be the same as or different from each other; $Y^2$ and $Y^4$ are each a Group 14 metal of the Periodic Table and specifically exemplified by C, Si, Ge, Sn and Pb, among which C and Si are preferable; $Y^2$ to $Y^4$ may be the same as or different from each other.

As the oxygen atom-containing compound represented by the general formula (I) or (II), there is preferably usable the reaction product between an organoaluminum compound and water, which product is principally a chain alkylaluminoxane represented by the general formula (XII)

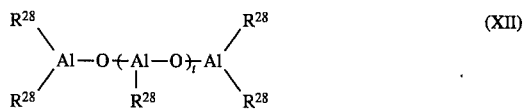

wherein t is a number from 2 to 50 indicating polymerization degree and $R^{28}$ represents an alkyl group having 1 to 8 carbon atoms, a cycloalkylaluminoxane having the repeating unit represented by the general formula (XIII):

$$\begin{array}{c}\text{(Al-O)}\\ \phantom{xx}|\\ \phantom{xx}R^{28}\end{array} \qquad \text{(XIII)}$$

wherein $R^{28}$ is as previously defined and the like. Of these alkylaluminoxanes, that wherein $R^{28}$ is a methyl group, i.e. methylaluminoxane is particularly preferred.

As the organoaluminum compound to be reacted with water, mention is made of an organoaluminum compound represented by the general formula (XIV)

$$AlR^{28}_3 \qquad \text{(XIV)}$$

wherein $R^{28}$ is as previously defined, more specifically, trimethylaluminum, triethylaluminum, triisobutylaluminum and the like and among them trimethylaluminum is particularly desirable.

Generally, the reaction product of an alkylaluminum compound such as trialkylaluminum with water contains the above-mentioned chain alkylaluminoxane and cycloalkylaluminoxane as principal components, unreacted trialkylaluminum, a mixture of various condensation products, and further complicatedly associated molecules thereof, which becomes various products according to the contacting conditions of the trialkylaluminum compound and water.

The reaction of the trialkylaluminum compound with water is not specifically limited, but can be performed according to any of known methods.

The oxygen atom-containing compound as the component (b) in the present invention may be used alone or in combination with at least one other one. Also there may be used as the component (B) at least one compound of the component (a) in combination with at least one compound of the component (b).

The polymerization catalyst according to the present invention may contain, when necessary, an alkyl group-containing metallic compound as component (C) in addition to the above-described components (A) and (B).

There are available various alkyl group-containing metallic compounds as the component (C), which are exemplified by the aluminum compound having an alkyl group represented by the general formula (XV)

$$R^{29}_x Al(OR^{30})_y Q_{3-x-y} \qquad \text{(XV)}$$

wherein $R^{29}$ and $R^{30}$ are each an alkyl group having 1 to 8, preferably 1 to 4 carbon atoms, Q is a hydrogen atom or a halogen atom, x satisfies the relation $0<x\leq 3$, desirably x=2 or 3, most desirably x=3, and y satisfies the relation $0\leq y<3$ desirably y=0 or 1; the magnesium compound having an alkyl group represented by the general formula (XVI)

$$R^{29}_2 Mg \qquad \text{(XVI)}$$

wherein $R^{29}$ is as previously defined; the zinc compound having an alkyl group represented by the general formula (XVII)

$$R^{29}_2 Zn \qquad \text{(XVII)}$$

wherein $R^{29}$ is as previously defined; and the like.

The aforesaid compound having an alkyl group are preferably aluminum compounds having an alkyl group, more desirably trialkylaluminium compounds and dialkylaluminum compounds. Examples of the compounds, that is, the components (C) include trialkylaluminum such as trimethylaluminum, triethylaluminum, tri-n-propylaluminum, triisopropylaluminum, tri-n-butyl-aluminum, triisobutylaluminum and tri-tert-butylaluminum; dialkylaluminum halide such as dimethylaluminum chloride, diethylaluminum chloride, di-n-propylaluminum chloride, diisopropylaluminum chloride, di-n-butylaluminum chloride, diisobutylaluminum chloride and di-tert-butylaluminum chloride; dialkylaluminum alkoxide such as dimethylaluminum methoxide and dimethylaluminum ethoxide; dialkylaluminum hydride such as dimethylaluminum hydride, diethylaluminum hydride and diisobutylaluminum hydride, dialkylmagnesium such as dimethylmagnesium, diethylmagnesium, di-n-propylmagnesium and diisopropylmagnesium; and dialkylzinc such as dimethylzinc, diethylzinc, di-n-propylethylzinc and diisopropylzinc, and the like.

Any of the aforesaid alkyl group-containing metallic compounds may be used alone or in combination with at least one other one.

The polymerization catalyst of the present invention, which comprises the abovestated components (A) and (B) and, as required, (C) as primary ingredients, can be prepared by various methods. In the case of preparing the catalyst comprising the components (A), (B) and (C), there is employed ① a method in which the reaction product between the components (A) and (B) is incorporated with the component (C) to form a catalyst, with which a monomer to be polymerized is brought into contact; ② a method in which the reaction product between the components (A) and (C) is incorporated with the component (B) to form a catalyst, with which a monomer to be polymerized is brought into contact; ③ a method in which the reaction product between the components (B) and (C) is incorporated with the component (A) to form a catalyst, with which a monomer to be polymerized is brought into contact; or ④ method in which each of the components (A), (B) and (C) is added, one by one, to a monomer to be polymerized. At any rate, the component (C) may be added to the reaction product between the components (A) and (B), to a polymer to be polymerized, or to both the aforesaid reaction product and the monomer to be polymerized.

In the case of preparing the catalyst comprising the components (A) and (B), there is employed ① a method in which a monomer to be polymerized is brought into contact with the reaction product between the components (A) and (B) as the catalyst; ② a method in which a monomer to be polymerized is brought into contact with the mixture of the components (A) and (B) as a catalyst; or ③ a method in which each of the components (A) and (B) is contact added, one by one, to a monomer to e polymerized.

The addition or contact of the above-mentioned components (A), (B) and (C) may be carried out at a temperature in the range of 0° to 100° C., and needless to say, at the polymerization temperature.

The catalyst according to the present invention as described hereinbefore exhibits a high activity in the production of a styrenic polymer having a high degree of syndiotactic configuration.

The production of the styrenic polymer according to the present invention is put into practice by homopolymerizing or copolymerizing a styrene and/or a styrenic monomer such as a styrene derivative or copolymerizing a styrenic monomer and an olefinic compound and/or a diolefinic compound in the presence of polymerization catalyst for SPS, preferably the catalyst comprising the components (A) and (B), and when necessary, the component (C).

It is indispensable in the present invention to employ a styrenic monomer having a content of indene-based compounds of at most 50 ppm, particularly preferably at most 30 ppm in view of the catalytic activity. A content of indene-based compounds more than 50 ppm in the styrenic monomer causes a decrease in the catalytic activity.

As the styrenic monomer, there is preferably used a compound represented by the general formula (XVIII)

(XVIII)

wherein $R^{31}$ is hydrogen atom, a halogen atom or a hydrocarbon group having 1 to 20 carbon atoms, m is an integer from 1 to 3 and when m is 2 or greater, a plurality of $R^{29}$ may be the same or different.

Examples of the compound of the general formula (XVIII) include styrene; alkylstyrenes such as p-methylstyrene; m-methylstyrene; o-methylstyrene; 2,4-dimethylstyrene; 2,5-dimethylstyrene; 3,4-dimethylstyrene; 3,5-dimethylstyrene; and p-tertiary-butylstyrene; polyvinylbenzenes such as p-divinylbenzene; m-divinylbenzene; and trivinylbenzene; halogenated styrenes such as p-chlorostyrene; m-chlorostyrene; o-chlorostyrene; p-bromostyrene; m-bromostyrene; o-bromostyrene; p-fluorostyrene; m-fluorostyrene; o-fluorostyrene and o-methyl-p-fluorostyrene; alkoxystyrenes such as methoxystyrene; ethoxystyrene; and tert-butoxystyrene; and a mixture of at least two of them.

As the indene-based compounds contained in the above-mentioned styrenic monomer, mention is made of the compound represented by any of the general formulae (XIX) and (XX)

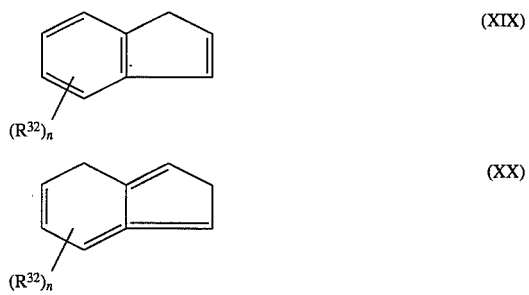

wherein $R^{32}$ is hydrogen atom or a hydrocarbon group having 1 to 20 carbon atoms, n is an integer from 1 to 3 and, when n is 2 or greater, a plurality of $R^{32}$ may be the same or different.

Examples of the compound of any of the general formulae (XIX) and (XX) include 1H-indene, 2H-indene, 4-methyl-1H-indene, 5-methyl-1H-indene, 6-methyl-1H-indene, 7-methyl-1H-indene, 4-methyl-2H-indene, 5-methyl-2H-indene, 6-methyl-2H-indene, 7-methyl-2H-indene, 4,5,-dimethyl-1H-Indene, 4,6-dimethyl-1H-Indene, 4,7-dimethyl-1H-indene, 5,6-dimethyl-1H-indene, 5,7-dimethyl-1H-indene, 6,7-dimethyl-1H-indene, 4,5-dimethyl-2H-indene, 4,6-dimethyl-2H-indene, 4,7-dimethyl-2H-indene, 5,6-dimethyl-2H-indene, 5,7-dimethyl-2H-indene, 6,7-dimethyl-2H-indene, 4-ethyl-1H-indene, 5-ethyl-1H-indene, 6-ethyl-1H-indene, 7-ethyl-1H-indene, 4-ethyl-2H-indene, 5-ethyl-2H-indene, 6-ethyl-2H-indene, 7-ethyl-2H-indene and a mixture of at least two of them.

As for the styrenic monomer to be used in the present invention, the content of the indene-based compounds in said monomer is suppressed to at most 50 ppm by purifying the styrenic monomer containing the above-mentioned indene-based compound through distillation or chromatography, or by highly purifying a starting raw materials for the production of the styrenic monomer, for example, the removal of 2-methyl-1-ethylbenzene.

Examples of olefins to be copolymerized with the styrenic monomer include α-olefins such as ethylene; propylene; butene-1; pentene-1; hexene-1; heptene-1; octene-1; nonene-1; decene-1; 4-phenylbutene-1; 6-phenylhexene-1; 3-methylbutene-1; 4-methylpentene-1; 3-methylpentene-1; 3-methylhexene-1; 4-methylhexene-1; 5-methylhexene-1; 3,3-dimethylpentene-1; 3,4-dimethylpentene-1; 4,4-dimethylpentene-1; and vinylcyclohexane, halogen-substituted α-olefins such as hexafluoropropene; tetrafluoroethylene; 2-fluoropropene; fluoroethylene; 1,1-difluoroethylene; 3-fluoropropene; trifluoroethylene; and 3,4-dichlorobutene-1, cyclic olefins such as cyclopentene; cyclohexene; norbornene; 5-methylnorbornene; 5-ethylnorbornene; 5-propylnorbornene; 5,6-dimethylnorbornene; 1-methylnorbornene; 7-methylnorbornene; 5,5,6-trimethylnorbornene; 5-phenylnorbornene; and 5-benzylnorbornene.

Examples of diolefin include straight chain diolefins such as butadiene; isoprene; and 1,6-hexadiene, and cyclic diolefins such as norbornadiene; 5-ethylidenenorbornene; 5-vinylnorbornene; and dicyclopentadiene. The olefinic or diolefinic compound may be used alone or in combination with at least one other one.

In the present invention, the catalytic components (A) and (B) and, when necessary, (C) may be added, one by one, to the monomer to be polymerized; or premixed with a solvent such as an aromatic hydrocarbon, e.g. toluene and ethylbenzene or an aliphatic hydrocarbon, e.g. hexane and heptane prior to mixing with the monomer(S); or the component (C) may be added, in part or in whole, to the monomer(S).

The polymerization of the styrenic monomer or monomers may be carried out by means of bulk polymerization or solution polymerization by the use of an aliphatic hydrocarbon solvent such as pentane, hexane or heptane, an alicyclic hydrocarbon solvent such as cyclohexane or an aromatic hydrocarbon solvent such as benzene, toluene or xylene. The polymerization temperature is not specifically limited, but is usually in the range of 20° to 120° C., preferably 20° to 90° C. In addition, the polymerization reaction may be carried out in the presence of hydrogen in order to modify the molecular weight of the styrenic polymer to be produced.

The styrenic polymer thus obtained possesses a high degree of syndiotactic configuration in its polymerization chain of the styrenic monomer. Here, the styrenic polymer having a high degree of syndiotactic configuration in its polymerization chain of the styrenic monomer means that its stereochemical structure is mainly of syndiotactic configuration, i.e. the stereostructure in which phenyl groups or substituted phenyl group as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having a high degree of syndiotactic configuration" as mentioned in the present invention means homopolymer or copolymer of the above-described styrenic monomer and copolymer of said styrenic monomer and an olefinic and / or a diolefinic compound exemplified by polystyrene, poly(alkylstyrene), poly(halogenated styrene), poly(alkoxystyrene), poly(vinylbenzoate), poly(divinylbenzene), poly(organosilicostyrene), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) include poly(methylstyrene), poly(ethylstyrene) poly(isopropylstyrene), poly(tertbutylstyrene), etc., poly(halogenated styrene) include, poly(chlorostyrene), poly(bromostyrene), and poly(fluorostyrene), etc. The poly(alkoxystyrene) include, poly(methoxystyrene), poly(ethoxystyrene), etc.

The most desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

The styrenic polymer obtained according to the process of the present invention is that with a high degree of syndiotacticity usually having a weight-average molecular weight of 10,000 to 3,000,000, preferably 100,000 to 1,500,000 with a number-average molecular weight of 5,000 to 1,500,000, preferably 50,000 to 1,000,000.

The styrene polymer with a high degree of syndiotacticity has a melting point of 160° to 310° C. and is surpassingly superior to the conventional styrenic polymer having an atactic configuration with regard to heat resistance.

As described hereinbefore, the process according to the present invention makes it possible to decrease the amount of the residual metals in the resultant styrenic polymer without deterioration of the catalytic activity by the use of a styrenic monomer having a content of indene-based compounds of at most 50 ppm and at the same time, to simplify the production process of the styrenic polymer and curtail the production cost thereof.

In the following, the present invention will be described in more detail with reference to comparative examples and examples, which however, shall not be construed to limit the present invention thereto.

EXAMPLE 1

In a 50 milliliter (hereinafter abbreviated to "mL") vessel which had been dried and purged with nitrogen were successively placed 0.4 mL of 2 moles/liter (hereinafter abbreviated to "L") of triisobutylaluminum in 39.3 mL of toluene, 64 mg of dimethylanilinium tetrakis(pentafluorophenyl)borate, that is, DMAB and 0.32 mL of 250 mmol of pentamethylcyclopentadienyltitanium trimethoxide to prepare a preliminary mixed catalyst. The amount of indene contained in styrene was determined by gas chromatography. In a 30 mL vessel which had been dried and purged with nitrogen were placed 10 mL of styrene having an indene content of 5 ppm with heating to 70° C. and 250 µL of the preliminary mixed catalyst as prepared above to polymerize the styrene for 1 hour. After the completion of the reaction, the reaction product was dried to afford 4.11 g of a polymer. The resultant polymer was cut into slices of at most 1 mm in thickness, which were subjected to Soxhlet extraction for 6 hours by the use of methyl ethyl ketone (MEK) as the solvent to produce MIP (MEK-insoluble portion). As a result, the yield of the resultant SPS was 4.01 g with a raffinate (MIP) rate of 97.6% and an activity for SPS of 162 kg/-g-Ti.

Comparative Example 1

The procedure in Example 1 was repeated to produce a styrene polymer except that there was used styrene having an indene content of 60 ppm. The resultant 1.56 g of polymer was cut into slices of at most 1 mm in thickness, which were subjected to Soxhlet extraction for 6 hours by the use of MEK. As a result, the yield of the resultant SPS was 1.51 g with a raffinate rate of 96.8% and an activity for SPS of 63 kg/g-Ti.

EXAMPLES 2 to 7

Comparative Examples 2 to 7

The procedure in Example 1 was repeated to produce styrene polymers except that the titanium (Ti) compounds, coordination complex compounds and alkyl group-containing metallic compounds as given in Table 1 were used and that indene contents were altered as given also in Table 1. The respective polymers thus obtained were tested for activity for SPS and specificity (raffinate rate) in the same manner as in Example 1. The results are given in Table 1 collectively with those of Example 1 and Comparative Example 1.

TABLE 1

| | Ti compound | Coordination complex compound | Alkyl group-containing metallic compound | Indene content*[1] | Activity for SPS*[2] | Specificity*[3] |
| --- | --- | --- | --- | --- | --- | --- |
| Example 1 | Pentamethylcyclopentadienyl-titanium trimethoxide | DMAB | Triisobutylaluminum | 5 | 162 | 97.6 |
| Comp. Example 1 | Pentamethylcyclopentadienyl-titanium trimethoxide | DMAB | Triisobutylaluminum | 60 | 63 | 96.8 |
| Example 2 | Pentamethylcyclopentadienyl-titanium trimethoxide | DMAB | Triisobutylaluminum | 30 | 134 | 97 |
| Comp. Example 2 | Pentamethylcyclopentadienyl-titanium trimethoxide | DMAB | Triisobutylaluminum | 95 | 14 | 98 |
| Example 3 | Pentamethylcyclopentadienyl-titanium trimethoxide | FCB | Triisobutylaluminum | 11 | 187 | 96 |
| Comp. Example 3 | Pentamethylcyclopentadienyl-titanium trimethoxide | FCB | Triisobutylaluminum | 60 | 95 | 94 |
| Example 4 | Pentamethylcyclopentadienyl-tribenzyltitanium | PAB | Triisobutylaluminum | 5 | 154 | 98 |
| Comp. Example 4 | Pentamethylcyclopentadienyl-tribenzyltitanium | PAB | Triisobutylaluminum | 73 | 78 | 94 |
| Example 5 | Pentamethylcyclopentadienyl-trimethyltitanium | PBAB | Triisobutylaluminum | 2 | 211 | 98 |
| Comp. Example 5 | Pentamethylcyclopentadienyl-trimethyltitanium | PBAB | Triisobutylaluminum | 84 | 51 | 98 |

TABLE 1-continued

|  | Ti compound | Coordination complex compound | Alkyl group-contaning metallic compound | Indene content[*1] | Activity for SPS[*2] | Specificity[*3] |
|---|---|---|---|---|---|---|
| Example 6 | Pentamethylcyclopentadienyl-titanium trimethoxide | DMAB | Tri-n-butylaluminum | 11 | 154 | 94 |
| Comp. Example 6 | Pentamethylcyclopentadienyl-titanium trimethoxide | DMAB | Tri-n-butylaluminum | 71 | 69 | 95 |
| Example 7 | Pentamethylcyclopentadienyl-titanium trimethoxide | DMAB | Tri-n-butylaluminum | 9 | 143 | 97 |
| Comp. Example 7 | Pentamethylcyclopentadienyl-titanium trimethoxide | DMAB | Tri-n-butylaluminum | 68 | 59 | 98 |

[Remarks]
DMAB: dimethylanilinium tetrakis(pentafluorophenyl)borate
FCB: ferrocenium tetrakis(pentaflurorphenyl)borate
PAB: pyridinium tetrakis(pentafluorophenyl)borate
PBAB: p-bromophenyldimethylammonium tetrakis(pentafluorophenyl)borate
[*1]: ppm
[*2]: kg/Ti
[*3]: Raffinate rate after Soxhlet extraction for 6 hours with methyl ethyl ketone (%).

EXAMPLE 8

In a 50 mL vessel which had been dried and purged with nitrogen were successively placed 0.4 mL of 2 moles/L of triisobutylaluminum in 39.3 mL of toluene, 460 mg of methylaluminoxane and 0.32 mL of 250 mmol/L of pentamethylcyclopentadienyltitanium trimethoxide to prepare a preliminary mixed catalyst. The amount of indene contained in styrene was determined by gas chromatography. In a 30 mL vessel which had been dried and purged with nitrogen were placed 10 mL of styrene having an indene content of 5 ppm with heating to 70° C. and 250 µL of the preliminary mixed catalyst as prepared above to polymerize the styrene for 1 hour. After the completion of the reaction, the reaction product was dried to afford 4.27 of a polymer. The resultant polymer was cut into slices of at most 1 mm in thickness, which were subjected to Soxhlet extraction for 6 hours by the use of methyl ethyl ketone (MEK) as the solvent to produce MIP (MEK-insoluble portion). As a result, the yield of the resultant SPS was 4.15 g with a raffinate (MIP) rate of 97.2% and an activity for SPS of 168 kg/g-Ti.

Comparative Example 8

The procedure in Example 8 was repeated to produce a styrene polymer except that there was used styrene having an indene content of 60 ppm. The resultant 1.58 g of polymer was cut into slices of at most 1 mm in thickness, which were subjected to Soxhlet extraction for 6 hours by the use of MEK. As a result, the yield of the resultant SPS was 1.56 g with a raffinate rate of 98.7% and an activity for SPS of 63 kg/g-Ti.

EXAMPLE 9

In a 50 mL vessel which had been dried and purged with nitrogen were successively placed 39.7 mL of toluene, 460 mg of methylaluminoxane and 0.32 mL of 250 mmol/L of pentamethylcyclopentadienyltitanium trimethoxide to prepare a preliminary mixed catalyst. The amount of indene contained in styrene was determined by gas chromatography. In a 30 mL vessel which had been dried and purged with nitrogen were placed 10 mL of styrene having an indene content of 5 ppm with heating to 70° C. and 250 µL of the preliminary mixed catalyst as prepared above to polymerize the styrene for 1 hour. After the completion of the reaction, the reaction product was dried to afford 1.39 g of a polymer. The resultant polymer was cut into slices of at most 1 mm in thickness, which were subjected to Soxhlet extraction for 6 hours by the use of methyl ethyl ketone (MEK) as the solvent to produce MIP (MEK-insoluble portion). As a result, the yield of the resultant SPS was 1.35 g with a raffinate (MIP) rate of 97.1% and activity for SPS of 55 kg/g-Ti.

Comparative Example 9

The procedure in Example 9 was repeated to produce a styrene polymer except that there was used styrene having an indene content of 60 ppm. The resultant 0.53 g of polymer was cut into slices of at most 1 mm in thickness, which were subjected to Soxhlet extraction for 6 hours by the use of MEK. As a result, the yield of the resultant SPS was 0.51 g with a raffinate rate of 96.0% and an activity for SPS of 21 kg/g-Ti.

What is claimed is:

1. A process for producing a styrenic polymer having a syndiotactic configuration which comprises polymerizing a styrenic monomer having a content of indene-based compounds of at most 50 ppm by bringing a polymerization catalyst for producing the styrenic polymer having a syndiotactic configuration into contact with said styrenic monomer.

2. The process according to claim 1 wherein said polymerization catalyst comprises an (A) transition metal compound and (B) at least one compound selected from the group consisting of an (a) compound capable of reacting with said transition metal compound as the component (A) to form an ionic complex and a (b) oxygen atom-containing compound represented by the formula (I) or by the formula (II)

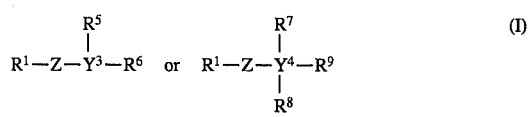

wherein Z is a structure in which one or more groups represented by the formula

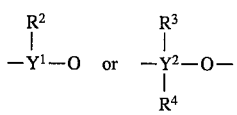

are arranged in an arbitrary order in the number of arbitrary positive integers; $R^1$ to $R^9$ are each an alkyl group having 1 to 8 carbon atoms and may be the same as or different from each other; $y^1$ and $y^3$ are each a Group 13 metal of the Periodic Table and may be the same as or different from each other; and $y^2$ and $y^4$ are each a Group 14 metal of the Periodic Table and may be the same as or different from each other.

3. The process according to claim 1 wherein said polymerization catalyst comprises an (A) transition metal compound, (B) at least one compound selected from the group consisting of an (a) compound capable of reacting with said transition metal compound as the component (A) to form an ionic complex and a (b) oxygen atom-containing compound represented by the formula (I) or by the formula (II)

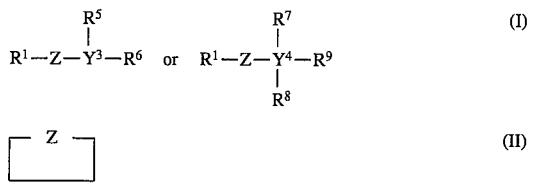

wherein Z is a structure in which one or more groups represented by the formula

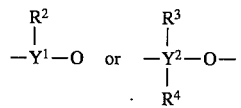

are arranged in an arbitrary order in the number of arbitrary positive integers; $R^1$ to $R^9$ are each an alkyl group having 1 to 8 carbon atoms and may be the same as or different from each other; $Y^1$ and $Y^3$ are each a Group 13 metal of the Periodic Table and may be the same as or different from each other; and $y^2$ and $y^4$ are each a Group 14 metal of the Periodic Table and may be the same as or different from each other and a (C) alkyl group-containing metallic compound.

4. The process according to claim 2 wherein the transition metal compound as the component (A) is a titanium compound which has at least one ligand with conjugated π electrons.

5. The process according to claim 3 wherein the transition metal compound as the component (A) is a titanium compound which has at least one ligand with conjugated π electrons.

6. The process according to claim 2 Wherein the oxygen atom-containing compound as the component (B)-(b) is a reaction product of an organoaluminum compound and water.

7. The process according to claim 3 wherein the oxygen atom-containing compound as the component (B)-(b) is a reaction product of an organoaluminum compound and water.

8. The process according to claim 3 wherein the alkyl group-containing compound as the component (C) is an alkyl group-containing aluminum compound.

9. The process according to claim 1 wherein said styrenic monomer has a content of indene-based compounds of at most 30 ppm.

10. The process according to claim 1 wherein said styrenic monomer having a content of indene-based compounds of at most 50 ppm is produced by purifying a styrenic monomer containing indene-based compounds by means of at least one process selected from the group consisting of distillation and chromatography.

* * * * *